(12) United States Patent
Sandstrom

(10) Patent No.: US 6,649,678 B1
(45) Date of Patent: Nov. 18, 2003

(54) RUBBER COMPOSITION CONTAINING ETHYLENEDIAMINE DERIVATIVE AND METHOD OF MAKING SAME

(75) Inventor: Paul Harry Sandstrom, Cuyahoga Falls, OH (US)

(73) Assignee: Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/331,709

(22) Filed: Dec. 30, 2002

(51) Int. Cl.$^7$ .................................................. C08K 5/20
(52) U.S. Cl. ......................... 524/228; 524/52; 524/571; 524/575; 524/474; 524/484; 524/485; 152/450; 152/525
(58) Field of Search ................................ 524/228, 571, 524/575, 52, 474, 484, 485; 525/236; 152/450, 525

(56) References Cited

U.S. PATENT DOCUMENTS

| | | | | |
|---|---|---|---|---|
| 3,933,714 A | * | 1/1976 | Adams | ........................ 524/228 |
| 4,866,100 A | * | 9/1989 | Johnson et al. | ............. 524/228 |
| 4,981,899 A | * | 1/1991 | Nakamura et al. | ........... 524/228 |
| 6,057,392 A | | 5/2000 | Wideman et al. | |
| 6,448,318 B1 | | 9/2002 | Sandstrom | |

OTHER PUBLICATIONS

Rubber Technology, 3rd ed., Van Nostrand Reinhold, N.Y., 1987, pp. 260–262, 271–272.*

* cited by examiner

Primary Examiner—Fred Teskin
(74) Attorney, Agent, or Firm—Wood, Herron & Evans LLP

(57) ABSTRACT

One aspect of the invention is directed to a rubber composition which includes at least one sulfur-vulcanizable elastomer containing olefinic unsaturation, a first processing aid, and a second processing aid of the formula:

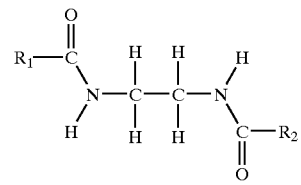

wherein each of $R_1$ and $R_2$ independently is selected from the group consisting of alkyls having from 12 to 24 carbon atoms, and alkenyls having from 12 to 24 carbon atoms. The elastomer is present in an amount of 100 parts by weight. Also, the first processing aid may be present in an amount of 0 to 20 phr, and the second processing aid may be present in an amount of 0.2 to 20 phr. Another aspect of the invention is directed to a method of making the rubber composition described immediately above, with the method including the step of mixing the elastomer, first processing aid, and second processing aid. The rubber composition and method not only allow for rapid addition of fillers and other ingredients with lower power consumption, but also provide a faster cure rate, as well as improved tear resistance in the finished product.

20 Claims, No Drawings

RUBBER COMPOSITION CONTAINING ETHYLENEDIAMINE DERIVATIVE AND METHOD OF MAKING SAME

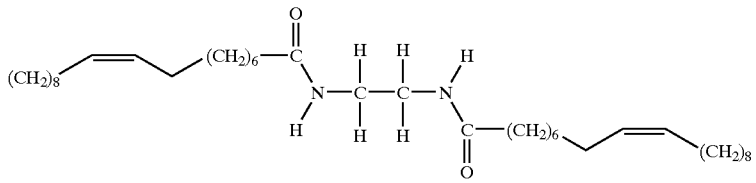

BACKGROUND OF THE INVENTION

I. Field of the Invention

The present invention relates to rubber compositions, and more particularly, to rubber compositions including one or more processing aids.

II. Description of the Related Art

Processing aids are commonly used in both natural and synthetic rubber compositions. Representative examples of processing aids include naphthenic oil, paraffinic oil, and aromatic oil. Such processing aids are used during mixing, thereby permitting fillers and other ingredients to be added more rapidly and with lower power consumption.

Despite these benefits, and depending on the particular rubber composition, such processing aids may end up extending the time required to cure a particular rubber composition. Also, such processing aids may adversely affect the performance of the resulting rubber product.

SUMMARY OF THE INVENTION

The present invention overcomes the above-mentioned drawbacks by providing a rubber composition which not only allows for rapid addition of fillers and other ingredients with lower power consumption, but also provides a faster cure rate, as well as improved tear resistance in the finished product.

One aspect of the invention is directed to a rubber composition which includes at least one sulfur-vulcanizable elastomer containing olefinic unsaturation, a first processing aid, and a second processing aid of the formula:

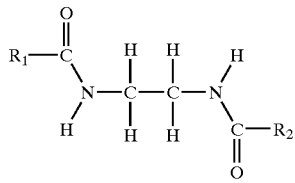

wherein each of $R_1$ and $R_2$ independently is selected from the group consisting of alkyls having from 12 to 24 carbon atoms, and alkenyls having from 12 to 24 carbon atoms. The elastomer is present in an amount of 100 parts by weight. Also, the first processing aid may be present in an amount of 0 to 20 phr, and the second processing aid may be present in an amount of 0.2 to 20 phr.

Another aspect of the invention is directed to a method of processing the rubber composition described immediately above, with the method including the step of mixing the elastomer, first processing aid, and second processing aid.

With regard to the second processing aid, each of $R_1$ and $R_2$ may be an alkenyl having from 16 to 20 carbon atoms. Also, if desired, the second processing aid may be N,N'-dioleoylethylenediamine ("DOED"). The formula for DOED is as follows:

If desired, the first processing aid may be selected from the group consisting of a naphthenic oil, a paraffinic oil, an aromatic oil, and combinations of such oils. With regard to the sulfur-vulcanizable elastomer, if desired, the elastomer may be a homo-, co-, or ter-polymer produced using a monomer selected from the group consisting of isoprene, butadiene, styrene, and combinations thereof.

In a further aspect, the composition may include a reinforcing filler. If desired, the reinforcing filler may be selected from the group consisting of carbon black, amorphous precipitated silica, starch, clay, and combinations thereof. The carbon black may be used in an amount of 20 to 100 phr, and the silica may be used in an amount of 0 to 30 phr.

DETAILED DESCRIPTION OF SEVERAL VERSIONS OF THE INVENTION

The invention is directed to a rubber composition and method of making the rubber composition. The composition, itself, is a mixture of 100 parts by weight of at least one sulfur-vulcanizable elastomer containing olefinic unsaturation, a first processing aid, and a second processing aid of the formula:

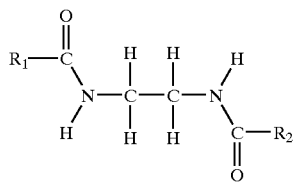

wherein each of $R_1$ and $R_2$ independently is selected from the group consisting of alkyls having from 12 to 24 carbon atoms, and alkenyls having from 12 to 24 carbon atoms. The first processing aid is present in an amount of 0 to 20 phr, and the second processing aid is present in an amount of 0.2 to 20 phr. This mixture of component ingredients provides several benefits and advantages. For example, the inclusion of the second processing aid results in a faster cure time, as well as a greater resistance to tearing in the resulting product.

The sulfur-vulcanizable elastomer containing olefinic unsaturation may be a homo-, co-, or ter-polymer made from any suitable, commercially-available monomer. For example, isoprene, butadiene, styrene, and combinations thereof may be used.

In similar fashion, the first processing aid may be any suitable, commercially-available processing aid. For example, the first processing aid may be a naphthenic oil, a paraffinic oil, and/or an aromatic oil.

With regard to the second processing aid, in one particular version of the invention, the processing aid may be a particular ethylenediamine derivative, namely N,N'- dioleoylethylenediamine ("DOED"). This particular ethylenediamine derivative has the structural formula:

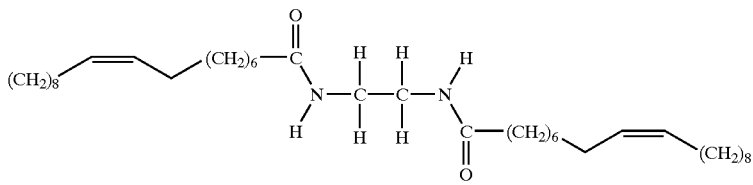

DOED is commercially available from Lonza Inc. under the trademark Glycolube VL™.

The rubber composition may include other ingredients, as desired. For example, the mixture of ingredients may include one or more reinforcing fillers. For example, 20 to 100 phr of carbon black and/or 0 to 30 phr of amorphous precipitated silica may be used.

The rubber composition may be processed using any suitable method, as known in the industry. The following examples of rubber compositions and processing methods are provided in order to illustrate the principles of the invention. However, the invention is not limited to these examples.

EXAMPLE I

In this example, N,N'-dioleoylethylenediamine diamine ("DOED") was evaluated as a partial replacement for naphthenic/paraffinic oil in a rubber composition which contained 50 phr carbon black. The rubber blend contained natural rubber and high cis-1,4-polybutadiene. Such compositions may be used, for example, to form a sidewall in a passenger tire or a truck tire.

The rubber compositions containing the materials shown in Table 1 were prepared in a lab Banbury mixer using three separate steps of mixing, two non-productive mix stages and one productive mix stage. The first non-productive stage was mixed for about 3 minutes to a drop temperature of about 160° C. The second non-productive mix stage was mixed for about 2 minutes to a drop temperature of about 150° C. The mixing time for the productive stage was about 2 minutes to a final compound temperature of about 108° C. The rubber compositions are identified herein as Samples A, B and C. Sample A contained 12 phr of conventional naphthenic/paraffinic oil and is considered the control sample. Samples B and C contained DOED as a partial replacement (1.5 and 3 phr) for the conventional processing oil. The test samples were cured for 36 minutes at 150° C.

Table 2 illustrates the cure behavior and cured physical properties of Samples A, B and C after processing. Strebler tear testing was determined by pulling one compound away from another at a right angle to the untorn test specimen with the two ends being pulled apart at a 180° angle to each other using an Instron machine. The area of contact was determined from placement of a Mylar® sheet between the compounds during curing. Analysis of the cured property results showed the benefit of partial replacement of conventional processing oil with DOED as related to tear resistance measured at 95° C. Samples B and C showed much higher values for tear as compared to control Sample A. Samples B and C also showed faster cure rates as shown by lower $T_{90}$ values by Rheometer testing at 150° C. This allows for shorter curing times during the final curing process. All other measured properties were comparable for Samples A, B and C.

TABLE 1

| | Sample A | Sample B | Sample C |
|---|---|---|---|
| First Non-Productive Mix Stage | | | |
| High cis-1,4-polybutadiene[a] | 60 | 60 | 60 |
| Natural Rubber | 40 | 40 | 40 |
| Carbon Black[b] | 50 | 50 | 50 |
| Naphthenic/paraffinic oil[c] | 12 | 10.5 | 9 |
| Wax[d] | 1 | 1 | 1 |
| Antioxidant[e] | 4 | 4 | 4 |
| Fatty Acid | 1 | 1 | 1 |
| N,N'-dioleoylethylene diamine | 0 | 1.5 | 3 |
| Second Non-Productive Mix Stage | | | |
| | | Remill of first non-productive mix stage | |
| Productive Mix Stage | | | |
| Accelerators[f] | 0.7 | 0.7 | 0.7 |
| Zinc Oxide | 3.5 | 3.5 | 3.5 |
| Sulfur | 2 | 2 | 2 |
| Antioxidant[g] | 1.25 | 1.25 | 1.25 |

[a]Budene 1207 ® from the Goodyear Tire & Rubber Company
[b]ASTM N550
[c]Flexon 641 from ExxonMobil Co.
[d]Mixture of microcrystalline and paraffinic waxes
[e]Santoflex ® PPD from Flexsys
[f]Mixture of sulfenamide and guanidine types
[g]Wingstay 100 ® from the Goodyear Tire & Rubber Co.

TABLE 2

| Samples | A | B | C |
|---|---|---|---|
| Conventional processing oil | 12 | 10.5 | 9 |
| N,N'-dioleoylethylene diamine | 0 | 1.5 | 3 |
| Rheometer, 150° C. | | | |
| Max Torque | 10.4 | 10.7 | 10.4 |
| Min Torque | 2 | 2 | 2 |
| Delta Torque | 8.4 | 8.5 | 8.4 |
| $T_{90}$, minutes | 8.0 | 7.2 | 6.6 |
| Stress-Strain | | | |
| 100% modulus (MPa) | 1.1 | 1.1 | 1.1 |
| 300% modulus (MPa) | 4.9 | 5.1 | 5.0 |
| Tensile Strength (MPa) | 11.9 | 12.3 | 13.0 |
| Elongation at break (%) | 550 | 560 | 590 |
| Hardness | | | |
| RT, 23° C. | 50 | 51 | 51 |
| 100° C. | 46 | 47 | 46 |
| Rebound | | | |
| RT, 28° C. | 58 | 59 | 56 |
| 100° C. | 61 | 62 | 61 |

TABLE 2-continued

| Samples | A | B | C |
|---|---|---|---|
| RPA @ 100° C., 10% strain, 11 Hz | | | |
| G' (KPa) | 706 | 710 | 697 |
| Tan Delta | .13 | .13 | .13 |
| Strebler Tear | | | |
| N, 95° C. | 41 | 77 | 138 |

EXAMPLE II

In this example, N,N'-dioleoylethylene diamine ("DOED") was evaluated as a partial or total replacement for naphthenic/paraffinic oil in a rubber composition which contained 50 phr carbon black. The rubber composition, which contained 100 phr emulsion SBR, may be used, for example, as a tire tread compound.

The rubber compositions shown in Table 3 were prepared in a lab Banbury mixer using mixing conditions similar to those of Example I. The rubber compositions are identified as Samples D, E and F. Sample D contained 5 phr of conventional naphthenic/paraffinic oil and is considered the control sample. Samples E and F contained 2.5 and 5 phr, respectively, of the DOED as replacement for the conventional processing oil. The test samples were cured for 36 minutes at 150° C.

Table 4 illustrates the cure behavior and cured physical properties of Samples D, E and F. Samples E and F showed faster cure rates. Analysis of the cured property results showed the benefit of total replacement (Sample F) of conventional processing oil with DOED, as related to tear resistance. All other cured physical properties for Samples E and F were similar to control Sample D.

TABLE 3

| | Sample D | Sample E | Sample F |
|---|---|---|---|
| First Non-Productive Mix Stage | | | |
| Emulsion SBR[a] | 100 | 100 | 100 |
| Carbon Black[b] | 50 | 50 | 50 |
| Naphthenic/paraffinic oil | 5 | 2.5 | .0 |
| Antioxidant[c] | 2 | 2 | 2 |
| Fatty Acid | 2 | 2 | 2 |
| Zinc Oxide | 3 | 3 | 3 |
| N,N'-dioleoylethylene diamine | 0 | 2.5 | 5 |
| Second Non-Productive Mix Stage | | | |
| | Remill of first non-productive mix stage | | |
| Productive Mix Stage | | | |
| Accelerators[d] | 2 | 2 | 2 |
| Sulfur | 1 | 1 | 1 |

[a]PLF 1502 from the Goodyear Tire & Rubber Co.
[b]ASTM N299
[c]Quinoline Type
[d]Blend of sulfenamide with diphenyl guanidine.

TABLE 4

| | Sample D | Sample E | Sample F |
|---|---|---|---|
| Conventional Processing Oil | 5 | 2.5 | 0 |
| N,N'-dioleoylethylene diamine | 0 | 2.5 | 5 |
| Rheometer, 150° C. | | | |
| Max Torque | 17.2 | 16.3 | 15.9 |
| Min Torque | 2.3 | 2.2 | 2.3 |

TABLE 4-continued

| | Sample D | Sample E | Sample F |
|---|---|---|---|
| Delta Torque | 14.9 | 14.1 | 14.6 |
| T$_{90}$, minutes | 20.0 | 19.0 | 17.0 |
| Stress-Strain | | | |
| 100% of modulus (MPa) | 2.1 | 2.3 | 2.1 |
| 300% of modulus (MPa) | 13.5 | 14.2 | 13.8 |
| Tensile Strength (MPa) | 24.5 | 22.0 | 21.6 |
| Elongation at Break (%) | 470 | 430 | 430 |
| Hardness | | | |
| RT | 69 | 71 | 70 |
| 100° C. | 59 | 58 | 58 |
| Rebound | | | |
| RT | 47 | 43 | 45 |
| 100° C. | 57 | 55 | 57 |
| RPA @ 100° C., 10% Strain, 11 Hz | | | |
| G' (KPa) | 1203 | 1145 | 1155 |
| Tan Delta | .14 | .13 | .13 |
| Strebler Tear | | | |
| N, 95° C. | 102 | 102 | 139 |
| DIN Abrasion | | | |
| Relative Volume Loss | 87 | 86 | 87 |

EXAMPLE III

In this example, N,N'-dioleoylethylene diamine ("DOED") was evaluated as a partial or total replacement for naphthenic/paraffinic oil in a rubber composition which contained 50 phr carbon black. The rubber composition, which contained 100 phr synthetic cis-1,4-polyisoprene, may be used, for example, as a tire tread compound.

The rubber compositions shown in Table 5 were prepared in a lab Banbury using mixing conditions similar to those of Example I. The rubber compositions are identified as Samples G, H and I. Sample G contained 5 phr of conventional naphthenic/paraffinic processing oil and is considered the control sample. Samples H and I contained 2.5 and 5 phr, respectively, of the DOED as replacements for the conventional processing oil. The test samples were cured for 36 minutes at 150° C.

Table 6 illustrates the cure behavior and cured physical properties of Samples G, H and I. Samples H and I showed faster cure rates. Analysis of the cured property results showed the benefit of replacing conventional processing oil with DOED, as related to tear resistance and abrasion resistance (lower numbers are positive). All other cured physical properties are similar.

TABLE 5

| | Sample G | Sample H | Sample I |
|---|---|---|---|
| First Non-Productive Mix Stage | | | |
| Cis-1,4-polyisoprene[a] | 100 | 100 | 100 |
| Carbon Black[b] | 50 | 50 | 50 |
| Naphthenic/paraffinic oil | 5 | 2.5 | 0 |
| Antioxidant[c] | 2 | 2 | 2 |
| Fatty Acid | 2 | 2 | 2 |
| Zinc Oxide | 3 | 3 | 3 |
| N,N'-dioleoylethylene diamine | 0 | 2.5 | 5 |
| Second Non-Productive Mix Stage | | | |
| | Remill of first non-productive mix stage | | |

TABLE 5-continued

|  | Sample G | Sample H | Sample I |
|---|---|---|---|
| Productive Mix Stage |  |  |  |
| Accelerator[d] | 1 | 1 | 1 |
| Sulfur | 1.4 | 1.4 | 1.4 |

[a]Synthetic cis-1,4-polyisoprene as NAT2200 from the Goodyear Tire & Rubber Co.
[b]ASTM N299
[c]Quinoline type
[d]Sulfenamide accelerator

TABLE 6

|  | Sample G | Sample H | Sample I |
|---|---|---|---|
| Conventional Processing Oil | 5 | 2.5 | 0 |
| N,N'-dioleoylethylene diamine | 0 | 2.5 | 5 |
| Rheometer, 150° C. |  |  |  |
| Max Torque | 18.3 | 18.2 | 17.2 |
| Min Torque | 2.5 | 2.6 | 2.4 |
| Delta Torque | 15.8 | 15.6 | 14.8 |
| $T_{90}$, minutes | 12.5 | 10.6 | 9.8 |
| Stress-Strain |  |  |  |
| 100% modulus (MPa) | 1.9 | 2.0 | 1.9 |
| 300% modulus (MPa) | 13.1 | 12.8 | 11.9 |
| Tensile Strength (MPa) | 22.5 | 23.5 | 23.0 |
| Elongation at break (%) | 460 | 480 | 490 |
| Hardness |  |  |  |
| RT | 66 | 67 | 67 |
| 100° C. | 61 | 59 | 57 |
| Rebound |  |  |  |
| RT | 49 | 47 | 46 |
| 100° C. | 64 | 64 | 64 |
| RPA at 100° C., 10% strain, 11 Hg |  |  |  |
| G' (KPa) | 1079 | 1077 | 1005 |
| Tan Delta | .15 | .14 | .13 |
| Strebler Tear |  |  |  |
| N, 95° C. | 112 | 123 | 117 |
| DIN Abrasion |  |  |  |
| Relative Volume Loss | 104 | 93 | 95 |

EXAMPLE IV

In this example, N,N'-dioleoylethylene diamine ("DOED") was evaluated as a total replacement for aromatic oil in a carbon composition which contained 30 phr carbon black and 30 phr silica. The rubber composition, which contained 80 phr high cis-1,4-polybutadiene and 20 phr natural rubber, may be used, for example, in a tread formulation.

The rubber composition shown in Table 7 was prepared in a lab Banbury mixer using four separate stages of mixing, three non-productive mix stages and one productive mix stage. In the first non-productive mix stage, the ingredients were mixed for about 3 minutes to a drop temperature of about 160° C. The second non-productive mix stage had similar mixing conditions. In the third non-productive mix stage, the ingredients were mixed for about 2 minutes to a batch temperature of about 160° C., followed by mixing for another 4 minutes at a constant batch temperature of 160° C. This stage was a heat treatment step to assure coupling of the silane coupling agent with the silica reinforcement. The mixing time for the productive mix stage was about 2 minutes to a final compound temperature of about 108° C. The rubber compositions are identified as J and K. Sample J contained 5 phr of aromatic processing oil and was considered the control sample. Sample K contained the experimental material (DOED) as a total replacement for the aromatic oil. The test samples were cured for 32 minutes at 150° C.

Table 8 illustrates the cure behavior and cured physical properties. Sample K showed a faster cure rate. The cured property results were quite similar for both samples.

TABLE 7

|  | Sample J | Sample K |
|---|---|---|
| First Non-Productive Mix Step |  |  |
| High cis-1,4-polybutadiene[a] | 80 | 80 |
| Natural Rubber | 20 | 20 |
| Carbon Black[b] | 30 | 30 |
| Aromatic Oil[c] | 5 | 0 |
| Wax | 1.5 | 1.5 |
| Zinc Oxide | 3 | 3 |
| N,N'-dioleoylethylene diamine | 0 | 5 |
| Second Non-Productive Mix Step |  |  |
| Silica[d] | 30 | 30 |
| Silane coupling agent[e] | 6 | 6 |
| Antioxidant[f] | 2.5 | 2.5 |
| Third Non-Productive Mix Step |  |  |
|  | Heat treatment step; no materials added. | |
| Productive Mix Step |  |  |
| Accelerators | 1.7 | 1.7 |
| Antioxidant[g] | 1 | 1 |
| Sulfur | 1.3 | 1.3 |

[a]BUDENE ® 1208 from the Goodyear Tire & Rubber Co.
[b]ASTM N121
[c]SUNDEX 8125 from Sun Oil
[d]Hi-Sil 210 from PPG Industries
[e]Si69 from Degussa, 50% active
[f]Santoflex ® PPD from Flexsys
[e]Wingstay ® 100 from the Goodyear Tire & Rubber Company

TABLE 8

|  | Sample J | Sample K |
|---|---|---|
| Aromatic Oil | 5 | 0 |
| N,N'-dioleoylethylene diamine | 0 | 5 |
| Rheometer, 150° C. |  |  |
| Max Torque | 23.6 | 22.7 |
| Min Torque | 3.2 | 3.3 |
| Delta Torque | 20.4 | 19.4 |
| $T_{90}$, minutes | 12.6 | 8.8 |
| Stress-Strain |  |  |
| 100% modulus (MPa) | 2.5 | 2.6 |
| 300% modulus (MPa) | 12 | 11.9 |
| Tensile Strength (MPa) | 17.5 | 16.3 |
| Elongation at break (%) | 430 | 410 |
| Hardness |  |  |
| RT | 71 | 73 |
| 100° C. | 65 | 65 |
| Rebound |  |  |
| RT | 54 | 50 |
| 100° C. | 64 | 64 |
| RPA at 100%, 10% strain, 11 Hz |  |  |
| G' (KPa) | 2138 | 1923 |
| Tan Delta | .077 | .076 |
| Strebler Tear |  |  |
| N, 95° C. | 120 | 117 |
| DIN Abrasion |  |  |
| Relative Volume Loss | 32 | 30 |

While the present invention has been illustrated by the description of several versions, and while the versions have been described in considerable detail, they are not intended to restrict or in any way limit the scope of the appended claims to such detail. Additional advantages and modifications will be readily apparent to those skilled in the art. The invention, in its broader aspects, is therefore not limited to the specific details, representative apparatus and methods, and illustrated examples shown and described. Accordingly, departures may be made from such details without departing from the scope or spirit of the inventor's general inventive concept.

What is claimed is:

1. A rubber composition, comprising:
   100 parts by weight of at least one sulfur-vulcanizable elastomer containing olefinic unsaturation;
   0 to 20 phr of a first processing aid; and
   0.2 to 20 phr of a second processing aid of the formula:

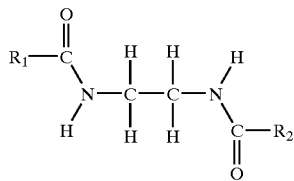

wherein each of $R_1$ and $R_2$ independently is an alkenyl having from 16 to 20 carbon atoms.

2. The composition of claim 1 wherein the second processing aid is N,N'-dioleoylethylenediamine.

3. The composition of claim 1 wherein the sulfur-vulcanizable elastomer is a homo-, co-, or ter-polymer produced using a monomer selected from the group consisting of isoprene, butadiene, styrene, and combinations thereof.

4. The composition of claim 1 wherein the first processing aid is selected from the group consisting of a naphthenic oil, a paraffinic oil, an aromatic oil, and combinations thereof.

5. The composition of claim 1 further including a reinforcing filler.

6. The composition of claim 5 wherein the reinforcing filler is selected from the group consisting of carbon black, amorphous precipitated silica, starch, clay, and combinations thereof.

7. The composition of claim 5 wherein the reinforcing filler includes 20 to 100 phr of carbon black.

8. The composition of claim 7 wherein the reinforcing filler further includes 0 to 30 phr of amorphous precipitated silica.

9. The composition of claim 5 wherein the reinforcing filler includes 0 to 30 phr of amorphous precipitated silica.

10. A method of making a rubber composition, comprising the step of:
    mixing 100 parts by weight of at least one sulfur-vulcanizable elastomer containing olefinic unsaturation, 0 to 20 phr of a first processing aid, and 0.2 to 20 phr of a second processing aid of the formula:

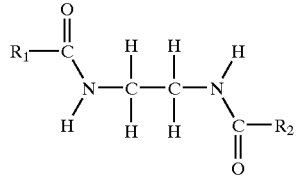

wherein each of $R_1$ and $R_2$ independently is an alkenyl having from 16 to 20 carbon atoms.

11. The method of claim 10 wherein the second processing aid is N,N'-dioleoylethylenediamine.

12. The method of claim 10 wherein the sulfur-vulcanizable elastomer is a homo-, co-, or ter-polymer produced using a monomer selected from the group consisting of isoprene, butadiene, styrene, and combinations thereof.

13. The method of claim 10 wherein the first processing aid is selected from the group consisting of a naphthenic oil, a paraffinic oil, an aromatic oil, and combinations thereof.

14. The method of claim 10 further including a reinforcing filler.

15. The method of claim 14 wherein the reinforcing filler is selected from the group consisting of carbon black, amorphous precipitated silica, starch, clay, and combinations thereof.

16. The method of claim 14 wherein the reinforcing filler includes 20 to 100 phr of carbon black.

17. The method of claim 16 wherein the reinforcing filler further includes 0 to 30 phr of amorphous precipitated silica.

18. The method of claim 14 wherein the reinforcing filler includes 0 to 30 phr of amorphous precipitated silica.

19. A tire sidewall or tread formed from the composition of claim 1.

20. A tire sidewall or tread formed from the method of claim 10.

* * * * *